Oct. 8, 1929.  J. A. B. SMITH  1,730,904

TYPEWRITING MACHINE

Filed Oct. 1, 1926

Inventor:
Jesse A B Smith
by D C Stickney
Attorney:

Patented Oct. 8, 1929

1,730,904

UNITED STATES PATENT OFFICE

JESSE A. B. SMITH, OF STAMFORD, CONNECTICUT, ASSIGNOR TO UNDERWOOD ELLIOTT FISHER COMPANY, OF NEW YORK, N. Y., A CORPORATION OF DELAWARE

TYPEWRITING MACHINE

Application filed October 1, 1926. Serial No. 138,865.

Perforated master-sheets for player-pianos are sometimes printed with the words of a song, and, as the sheets pass into view during the operation of such pianos, the words are exhibited seriatim, as a convenience to a vocalist.

The strip or sheet is passed from a supply-spool at the top to a receiving or driving spool at the bottom, and only a small portion of the strip is visible, and the printed matter is timed according to the notes being played by the instrument. The printed matter must therefore be read in an unnatural order, from the bottom up, as the strip moves down over a fixed indicator. This is difficult for the vocalist, and leads to errors, especially when reading long words, which, for the purpose of keeping time with the musical notes, are split into syllables, each of which makes an entire line of printing.

An object of this invention is to overcome this difficulty in reading the words and syllables on the traveling sheet. To this end, the words are re-copied upon the same sheet by means of a typewriting machine. The words and syllables are so typed line by line in a specially-equipped typewriting machine, in which the master-sheet is so placed that there is rendered visible to the operator each printed word or line that is about to be copied or typed.

For reasons that will appear, type-impressions are produced upon the back or opposite side of the sheet from the matter already printed upon the front of the sheet. This previous printing is read through the sheet. A mirror is used in reading, so as to render the printing legible through the sheet. As the typist proceeds, the result of the typing is visible upon the back of the sheet. The front of the sheet also receives impressions of the types, but they are reversed. These reversed type-impressions are produced by the aid of a carbon-sheet inserted between the master-sheet and the platen of the typewriter. The finished master-sheet may therefore contain successive lines of perforations, each line having opposite thereto the original printed word and the copied word, the latter appearing in reversed letters. Both the printed lines and the typewritten lines are in inverted or unnatural reading order.

Then, in order to read said lines with the typed sheet, a mirror is used and is mounted in the piano, to render the typed words normal and legible, and also to cause them in movement to appear in natural sequence or apparently following one another down the sheet.

The words are therefore back-typed upon the face of the master-sheet by means of a ribbon or carbon, and then the words are read through the mirror mounted in front of the music-strip. The use of the mirror enables the singer to read the words from top to bottom.

Since the songs are usually printed on the music-strip when made, it is only necessary to position the strip to the printing line in the typewriter, and then type the words on the opposite side of the strip. However, in order that the typing may appear reversed upon the strip without necessitating the construction of a special machine having reversed types, the music-strip is inserted around the platen, so that the front thereof faces the platen, the operator seeing only the back of the strip. In order that the printed matter upon the translucent music-strip may be readable from the back thereof, a special mirror is carried by the typewriter-carriage, to reverse the printed matter, so that it will appear normal. The original words are printed upon one margin of the strip only.

The reverse typing should appear on the other margin of the music-strip and on the front thereof. To this end, there is provided a carbon-tape, which is placed so that the carbonized side thereof faces the music-strip, that is, between the strip and the platen.

The music-strip is positioned to the first line of typing, and the words which are read through the mirror are copied upon the strip. In this manner, straight, normally-readable typing appears upon the back of the music-strip, which also appears reversed upon the front side of the music-strip. The straight typing serves as a check of what has been written upon the strip.

The carbon-strip is narrower than the music-strip, since only one word or a syllable is written upon each line, and the words are neatly placed one under the other. The carbon is fed by means of the platen and associated feed-rolls running thereon. After completing the typing, the strip is rewound onto the supply-spool and is ready for use on the musical instrument.

Other features and advantages will hereinafter appear.

In the accompanying drawings.

Figure 1:
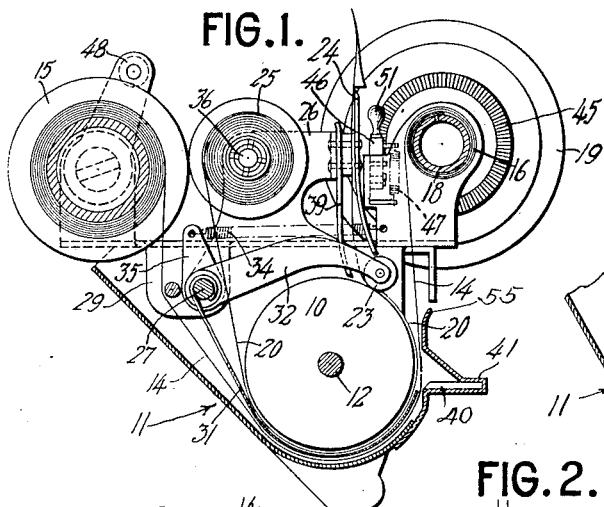
Figure 1 is a cross-sectional view of apparatus for carrying out the present invention, and shows the relative position of the music-strip and its associated carbon-tape.
Figure 3:
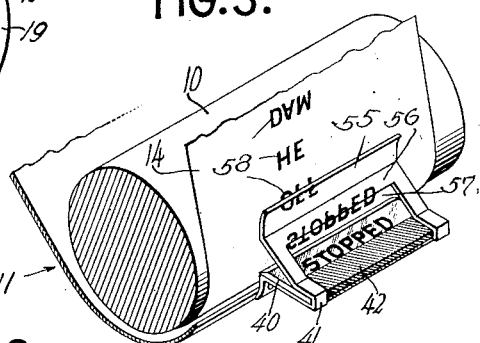
Figure 3 is a perspective view, showing the mirror for facilitating reading of the printed words, and also for aligning printed words on the strip to the printing line.
Figure 2:
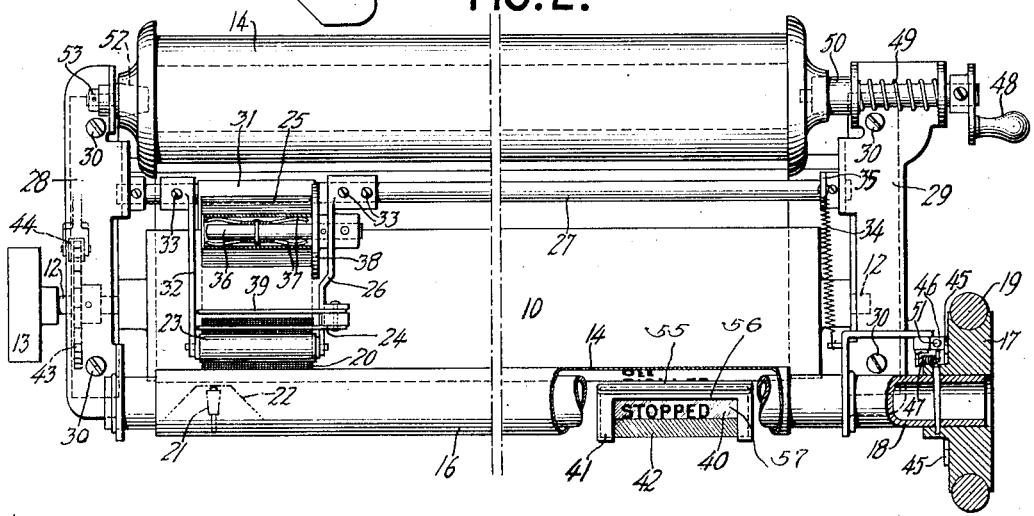
Figure 2 is a plan view, showing the invention applied to an Underwood typewriting machine.

In the Underwood typewriting machine a platen 10 is rotatably supported on a shiftable platen-frame 11, mounted on a traveling-carriage. The platen is carried by an axle 12, and may be rotated by means of finger-pieces 13 at the ends of the axle.

A music-strip 14 is originally wound onto a spool 15, from which it is unwound, and is passed around the underside of the platen, past the printing line, and is rewound onto a receiving spool 16, manually rotatable by means of a finger-wheel 17 at the end of a supporting shaft or tube 18. The wheel 17 may be provided with a rubber seam 19 to facilitate gripping thereof.

In order that reversed typing may be written upon the front of the music-strip, it is proposed to position the strip, so that the front thereof faces the platen, and then to type upon the front of the strip by means of a carbon-tape 20, arranged between the strip and the platen, so that the carbonized side thereof faces the music-strip. In this manner, when typing upon the back of the strip by means of type-bars 21 and an intervening ribbon 22, the reverse typing indicated at 61 will appear upon the front of the strip, which contacts with the carbonized side of the carbon-tape.

It is intended that the carbon-tape 20 may be fed at intervals by rotating the platen, and for this purpose there is provided a pressure-roll 23, bearing upon the carbon. The used portion of the tape may be torn off against a knife 24. The tape is drawn from a supply-spool 25, carried by a frame 26, secured to a cross-shaft 27, which may be journaled in end plates 28 and 29, which are fast to the platen-frame 11 by means of screws 30.

However, in order to prevent smudging the music-strip when the same is slid over the carbon-tape, there may be provided a plate 31 bent to conform with the curvature of the platen. This plate is interleaved between the strip and the tape, thus providing separate chutes, and is secured to the shaft 27 by curling one end thereof, as shown in Figure 1. One end of the pressure-roll 23 is rotatably mounted on the frame 26, the other end being rotatably supported by an arm 32, secured to the shaft 27 by means of a screw 33. A pair of similarly numbered screws 33 serve for securing the frame 26 to the shaft 27, which is urged to swing and to press the pressure-roll 23 against the platen by means of a spring 34, mounted at the end of an arm 35, carried by the shaft 27.

The carbon-tape-spool 25 is held back by the friction of an arbor 36 provided with expansion-springs 37. The arbor and an associated flange 38 are carried by the frame 26. In order to dispose of the used portion of the carbon, there is provided a deflector-plate 39, which coacts with the lower portion of the knife 24 to form a passage-way and conduct the carbon to the knife-edge.

The music-strip is sufficiently translucent to permit reading of the typed matter, indicated at 59, through the strip from the back thereof, as noted at 58. In this invention, advantage is taken of this condition to facilitate the positioning of the strip to the printing line. To this end, there is provided a mirror 40, mounted on a frame 41, carried by the platen-frame 11. The mirror is placed at right angles to the platen and in front thereof, just below the printing line, and exposes only the line of printed matter on the printing line. The other lines above and below the printing line are concealed by a shield 56 on the frame 41 and by a black margin 42, which may be painted on the reflecting or bottom side of the mirror. This arrangement provides a definite and restricted field of vision noted at 57, which enables the operative to read off the word visible through the mirror, and then move the carriage to the end of its travel and type the same word upon the margin of the strip. Then the typed work indicated at 60 may be easily read, since the same is thus normally printed on the back of the strip by means of the ribbon 22.

On the other hand, the shield 56 is bent adjacent the platen and continued upward in the form of a paper-guard 55 to prevent any possible engagement of the music-strip with the shield or mirror resulting in tearing or damage to the strip.

The platen is held in a manner to prevent accidental rotation thereof, by means of the regular line-space-ratchet 43 and its associated retaining roller 44. Thus, when the music-strip is fed around the platen, the same is not rotated, but the strip instead is slipped over its surface. Then in order that the strip may be held under tension, to prevent drumming when struck by the types, there may be provided a retaining knurled ratchet 45, which may form an integral part of the wheel 17. This ratchet is engaged by a retaining pawl 46 held in contact with the ratchet by means of a spring 47. The supply-spool from which the music-strip is drawn is easily removed by pulling a handle 48 outwardly against the tension of a spring 49, which tends to hold a supporting shaft 50 in engagement with the spool. The shaft 50 serves also as a means for rewinding the strip back on the spool after typing. To do this, the pawl 45 is first released by means of a handle 51, and the handle 48 is rotated to thus revolve the spool on a supporting stud 52. The stud may be secured to the plate 28 by means of a nut 53.

Figure 4:
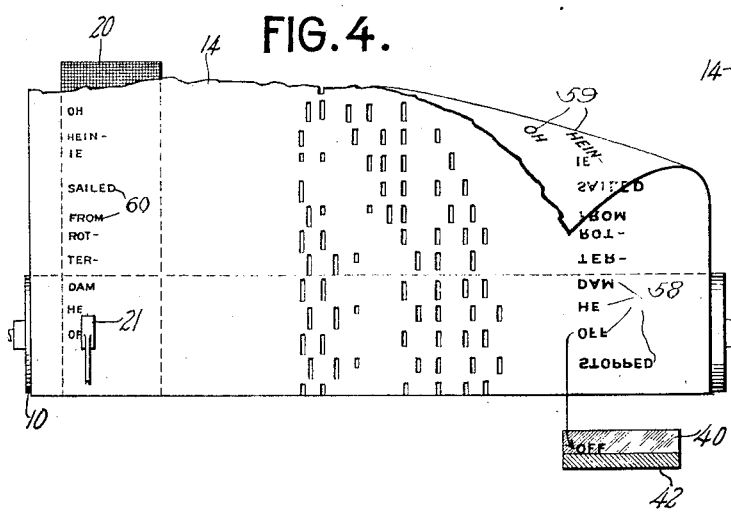
Figure 4 is a front view, showing the music-strip and its associated carbon-tape.
Figure 5:
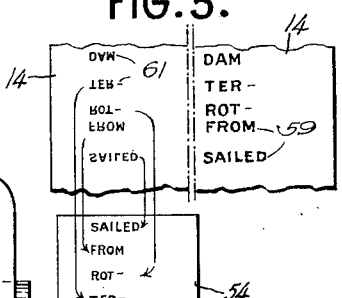
Figure 5 shows how the reversed typing on the strip is read through a mirror when placed on the musical instrument.

Referring more particularly to Figures 4 and 5, in which the music-strip in the machine and in the musical instrument is respectively illustrated, it will be noted that the word "OFF" at one margin is at the printing line, and may be read straight in the mirror from which it is copied and typed upon the other margin of the strip. In Figure 5 a mirror 54 is effective not only to straighten the reverse typing at 61, but to present the typing, so that the same may be read from top to bottom.

Variations may be resorted to within the scope of the invention, and portions of the improvements may be used without others.

Having thus described my invention, I claim:

1. In a typewriting machine, means for rendering readable from the back of a transparent sheet matter printed on the front side thereof, said means including a mirror-device disposed in front of the platen for exposing the printed matter and having a non-reflecting section, and a shield over said mirror cooperating with said non-reflecting section for indicating the position of the printed matter relative to the printing line.

2. In a machine for typing music-strips, the combination of a revoluble platen, feed-rolls running on the platen for feeding a carbon-strip therearound, a supply-spool for the music-strip which is passed around the platen and overlying said carbon whose work face is outwardly disposed, a receiving spool for the music-strip, the latter being inserted around the platen, so that the back thereof faces the types, and means for permitting normal reading of matter typed upon the front of the music-strip as each line passes the printing line, said means including a mirror-device in front of the printed matter, said mirror-device being effective to expose only the line of printed matter at the printing line.

3. A typewriting machine including, in combination, a revoluble platen, a feed-roll running on the platen for feeding a carbon-tape therearound past the printing line, a knife at the delivery side of the platen for severing the used portion of the carbon-tape, there being a plate overlying the carbon-tape, to permit a music-strip to be passed over said carbon and to be held under tension around the platen, and means for feeding the music-strip around the platen, said means including a supply-spool, frictional retaining means therefor, a receiving spool, means for rotating the receiving spool, and means to prevent accidental unwinding of said receiving spool.

4. The combination with a typewriting machine having a platen, of a detachable feed-roller for feeding a master-web about said platen while the same is in idle condition, pivot-means on said typewriting machine for supporting said feed-roller, a handle associated with said pivot-means, a take-up roller for said web, means to rotate said take-up roller, a carbon-feed roll disposed between said feed and take-up rollers having a carbon-strip conditioned for feeding about said platen and movable thereby independently of said web, and a shearing knife located upon said platen between said carbon-feed roll and said take-up roller.

5. The combination with a typewriting machine having a platen, of a detachable feed-roller for feeding a master-web about said platen while the same is in idle condition, pivot-means on said typewriting machine for supporting said feed-roller, a handle associated with said pivot-means, a take-up roller for said web, means to rotate said take-up roller, a carbon-feed roll disposed between said feed and take-up rollers having a carbon-strip conditioned for feeding about said platen and movable thereby independently of said web, and a mirror secured adjacent said platen proximate to the printing line thereof.

6. The combination with a typewriting machine having a platen, of a detachable feed-roller for feeding a master-web about said platen while the same is in idle condition, a take-up roller for said web, a carbon-feed roll disposed between said feed and take-up rollers having a carbon-strip conditioned to be fed about said platen and movable thereby independently of said web, a paper-table extending beneath said platen, and a mirror secured to said paper-table adjacent the printing line of the platen.

7. The combination with a typewriting machine having a platen and a carriage therefor, of a pair of aligned pivots mounted on said carriage, a master-web spool detachably mounted between said pivots for feeding a master-web about said platen, a take-up roller for said web having a finger-wheel thereon, a carbon-supply roll disposed between said spool and the take-up roller for feeding a carbon-strip with its transfer side facing outwardly about said platen beneath said web and within the edge thereof, and means to dispose of overhanging carbon-strip between said carbon-feed roller and the web take-up roller while retaining said web intact from said spool to said take-up roller, there being a shield between said carbon-strip and said web about said platen to permit independent feeding of said carbon-strip by rotation of said platen, and independent feeding of said web by rotation of said finger-wheel and said take-up roller.

8. The combination with a typewriting machine having a platen and a carriage therefor, of a pair of aligned pivots mounted on said carriage, a master-web spool detachably mounted between said pivots for feeding a master-web about said platen, a take-up roller for said web having a finger-wheel thereon, a carbon-supply roll disposed between said spool and the take-up roller for feeding a carbon-strip with its transfer side facing outwardly about said platen beneath said web and within the edge thereof, a shearing knife disposed between said spool and said take-up roller, brake-means associated with said finger-wheel to hold said roller stationary, and a mirror on said machine adjacent said platen, there being means adjacent said platen for separating said carbon-strip and said web to permit feeding of one independently of the other.

9. In a typewriting machine having a platen and a carriage therefor, the combination with a supply-spool for a web bearing a column of words adjacent its right side edge, and having a centrally-disposed lengthwise perforated section, of a take-up roller, and a mirror located before the right end of the platen adjacent the printing line thereof and movable with said carriage, the distance from the left end of said mirror to the printing point permitting sufficient leftward travel of said carriage for typing, adjacent the left side edge of said web, the longest word in said column.

10. A typewriting machine, including the combination of a movable carriage having a platen thereon, with a mirror mounted on the carriage adjacent the printing line of said platen and movable with the carriage, and a vision-shield disposed adjacent said mirror effective to limit the width of the reflection-field thereof for reflecting only a single word when the latter is positioned at the printing line.

11. A typewriting machine, including the combination with a movable carriage having a platen thereon, of a frame secured upon said carriage, a mirror mounted on said frame, a vision-shield for said mirror secured to said frame, and a paper-guard also secured to said frame adjacent said platen.

12. A typewriting machine, including the combination with a movable carriage having a platen thereon, of a mirror mounted adjacent the printing line of said platen, a vision-shield mounted over said mirror to locate and confine the reflection-field thereof, and a paper-guard secured to said shield above the printing line and adjacent said platen.

13. The method of producing a special master-web from a translucent common master-web having a plurality of perforations therethrough and a column of words and syllables on its face along one edge corresponding with said perforations, which method consists in feeding said web to a typewriting machine with its face next to the platen, reading the words and syllables thereof through said web, and typing the same words and syllables on the back of said web along the other edge to correspond serially with said first words and syllables and said perforations.

14. The method of producing a special master-web from a translucent common master-web having a plurality of perforations therethrough and a column of words and syllables on its face along one edge corresponding with said perforations, which method consists in feeding said web to a typewriting machine with the web-face next to the platen, reading the words and syllables thereof through said web, typing said words and syllables on the rear of said web in a descending column, and simultaneously producing inverted words and syllables on the face of said web integral in position with said typed words and syllables and conformed serially therewith and with said perforations and said first words and syllables.

15. The method of producing a special master-web from a translucent common master-web having a plurality of perforations therethrough and a column of words and syllables on its face along one edge corresponding with said perforations, which method consits in feeding said web to a typewriting machine with the web-face next to the platen, reading the words and syllables thereof through said web, and typing a column of inverted words and syllables on the face of the web corresponding serially with the words and syllables in said first-named column and with said perforations, in such manner as to appear in normal position when viewed through said web while said words and syllables are being produced.

16. In a typewriting machine of the kind described, the combination with a platen around which may be conducted a translucent perforated music-sheet, its front side facing the platen and having a blank side edge margin and an opposite margin printed with a column of words differently spaced apart to correspond with music-producing perforations in the sheet, of means for advancing said sheet around said platen to bring said words seriatim to the printing line, a mirror disposed adjacent the printing line, devices co-operating with said mirror for determining the advance of said sheet necessary to bring each of said differently spaced words accurately to the printing line, said mirror being effective to reflect and invert each printed word on the opposite side of said sheet so that its reflection appears normal and upright, instrumentalities for typing a duplicate of each printed word in alignment therewith on the back of said music-sheet adjacent the opposite side from said column, and means for feeding around said platen and under said blank margin, a carbon-strip having its work-face disposed next to said music-sheet for backprinting in said blank margin each word typed on the back of said music-sheet, each back-printed word being thereby properly positioned relative to its corresponding perforations for the purpose set forth.

JESSE A. B. SMITH.